(12) United States Patent
Tanouchi et al.

(10) Patent No.: US 10,868,481 B2
(45) Date of Patent: Dec. 15, 2020

(54) SERVO AMPLIFIER SELECTION DEVICE IN SYSTEM INCLUDING MULTIPLE CONVERTER UNITS

(71) Applicant: FANUC CORPORATION, Yamanashi (JP)

(72) Inventors: Hironao Tanouchi, Yamanashi (JP); Shinichi Mizukami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/546,298

(22) Filed: Aug. 21, 2019

(65) Prior Publication Data

US 2020/0096973 A1   Mar. 26, 2020

(30) Foreign Application Priority Data

Sep. 26, 2018   (JP) .................................. 2018-180851

(51) Int. Cl.
*H02P 8/40*   (2006.01)
(52) U.S. Cl.
CPC ...................................... *H02P 8/40* (2013.01)

(58) Field of Classification Search
CPC ...... G05B 19/4155; G05B 2219/34013; H02P 8/40; H02P 4/00; H02P 5/00; H02P 5/46
See application file for complete search history.

(56) References Cited

U.S. PATENT DOCUMENTS

2016/0240077 A1* 8/2016 Nagasaka ................. H04L 5/16
2018/0321119 A1* 11/2018 Yin ............................ G01N 3/56

FOREIGN PATENT DOCUMENTS

JP          2015-192475 A     11/2015

* cited by examiner

*Primary Examiner* — Daniel J Cavallari
(74) *Attorney, Agent, or Firm* — Hauptman Ham, LLP (57) ABSTRACT

A servo amplifier selection device includes: an amplifier group allocation section configured to allocate each of a plurality of motors to any one of a plurality of amplifier groups based on an amplifier group number; a total rated output calculation section configured to calculate, for each of the plurality of amplifier groups, a total value of rated outputs of the motors allocated to the amplifier group; a common power source selection section configured to, for each of a plurality of common power sources, selects the common power source that has a magnitude of the power source capacity satisfies a condition of being equal to or greater than the total value of each of the plurality of amplifier groups; and a display control section configured to get the selected common power source to be displayed in a display unit for each of the plurality of amplifier groups.

9 Claims, 9 Drawing Sheets

| GROUP NAME | $P_R$ | $P_{30}$ | $P_M$ |
|---|---|---|---|
| FIRST AMPLIFIER GROUP | 1 | 0 | 4 |
| SECOND AMPLIFIER GROUP | 1.6 | 2.2 | 4.6 |
| THIRD AMPLIFIER GROUP | 61.1 | 60 | 105.3 |

NO COMMON POWER SOURCE EXCEEDING 55 kW. PLEASE REDUCE ALLOCATED MOTORS.

| COMMON POWER SOURCE CAPACITY | FIRST AMPLIFIER GROUP | SECOND AMPLIFIER GROUP | THIRD AMPLIFIER GROUP |
|---|---|---|---|
| 7.5 kW | | | |
| 11 kW | | | |
| 15 kW | | | |
| ... | | | |
| 55 kW | | | |
| Note | | | NO CORRESPONDING COMMON POWER SOURCE |

NUMBER OF COMMON POWER SOURCES: 3  USED
(3 OR MORE REQUIRED)

| SHAFT NAME | MOTOR NAME | CONTINUOUS RATED OUTPUT [kW] | 30-MINUTE RATED OUTPUT [kW] | PEAK OUTPUT [kW] | AMPLIFIER GROUP |
|---|---|---|---|---|---|
| SERVO 0 | SERVO MOTOR A | 0.5 | 0 | 2 | 1 |
| SERVO 1 | SERVO MOTOR B | 30 | 0 | 50 | 3 |
| SERVO 2 | SERVO MOTOR B | 30 | 0 | 50 | 3 |
| SERVO 3 | SERVO MOTOR A | 0.5 | 0 | 2 | 3 |
| SERVO 4 | SERVO MOTOR A | 0.5 | 0 | 2 | 2 |
| SERVO 5 | SERVO MOTOR A | 0.5 | 0 | 2 | 3 |
| SERVO 6 | SERVO MOTOR A | 0.5 | 0 | 2 | 1 |
| SPINDLE 0 | SPINDLE MOTOR A | 0.55 | 1.1 | 1.32 | 2 |
| SPINDLE 1 | SPINDLE MOTOR A | 0.55 | 1.1 | 1.32 | 3 |
| SPINDLE 2 | SPINDLE MOTOR A | 0.55 | 1.1 | 1.32 | 2 |
| SPINDLE 3 | SPINDLE MOTOR A | 0.55 | 1.1 | 1.32 | 2 |

FIG. 4

| GROUP NAME | $P_R$ | $P_{30}$ | $P_M$ |
|---|---|---|---|
| FIRST AMPLIFIER GROUP | 31 | 0 | 54 |
| SECOND AMPLIFIER GROUP | 31.7 | 3.3 | 54 |
| THIRD AMPLIFIER GROUP | 2.1 | 1.1 | 6.3 |

SUPPRESSED TO EQUAL TO OR LESS THAN 55 kW IN EACH AMPLIFIER GROUP, ALLOCATION OF COMMON POWER SOURCE IS POSSIBLE

| COMMON POWER SOURCE CAPACITY | FIRST AMPLIFIER GROUP | SECOND AMPLIFIER GROUP | THIRD AMPLIFIER GROUP |
|---|---|---|---|
| 7.5kW | | | |
| 11kW | | | |
| 15kW | | | |
| ⋮ | | | |
| 55kW | | | |
| Note | | | |

NUMBER OF COMMON POWER SOURCES: 3 USED
(3 OR MORE REQUIRED)

| SHAFT NAME | MOTOR NAME | CONTINUOUS RATED OUTPUT [kW] | 30-MINUTE RATED OUTPUT [kW] | PEAK OUTPUT [kW] | AMPLIFIER GROUP |
|---|---|---|---|---|---|
| SERVO 0 | SERVO MOTOR A | 0.5 | 0 | 2 | 1 |
| SERVO 1 | SERVO MOTOR B | 30 | 0 | 50 | 1 |
| SERVO 2 | SERVO MOTOR B | 30 | 0 | 50 | 2 |
| SERVO 3 | SERVO MOTOR A | 0.5 | 0 | 2 | 3 |
| SERVO 4 | SERVO MOTOR A | 0.5 | 0 | 2 | 3 |
| SERVO 5 | SERVO MOTOR A | 0.5 | 0 | 2 | 3 |
| SERVO 6 | SERVO MOTOR A | 0.5 | 0 | 2 | 1 |
| SPINDLE 0 | SPINDLE MOTOR A | 0.55 | 1.1 | 1.32 | 2 |
| SPINDLE 1 | SPINDLE MOTOR A | 0.55 | 1.1 | 1.32 | 3 |
| SPINDLE 2 | SPINDLE MOTOR A | 0.55 | 1.1 | 1.32 | 2 |
| SPINDLE 3 | SPINDLE MOTOR A | 0.55 | 1.1 | 1.32 | 2 |

| AMPLIFIER GROUP NAME | THIRD AMPLIFIER GROUP |
|---|---|

| SHAFT NAME | APPLIED AMPLIFIER | WIDTH |
|---|---|---|
| SERVO 3 | AMPLIFIER A | 60mm |
| SERVO 4 | AMPLIFIER A | 60mm |
| SERVO 5 | AMPLIFIER A | 60mm |
| SPINDLE 1 | AMPLIFIER A | 60mm |

| | CONTINUOUS RATED OUTPUT [kW] | 30-MINUTE RATED OUTPUT [kW] | PEAK OUTPUT [kW] | APPLIED COMMON POWER SOURCE |
|---|---|---|---|---|
| TOTAL OUTPUT OF MOTORS (FOR COMMON POWER SOURCE SELECTION) | 2.1 | 1.1 | 6.3 | |
| RATED OUTPUT OF COMMON POWER SOURCE | 7.5 | 11.0 | 27.0 | $\alpha * 7.5$ (60mm) |

200V, 3φ  BREAKER    MAGNETIC CONTACTOR    AC REACTOR    300mm

SERVO AMPLIFIER SELECTION DEVICE IN SYSTEM INCLUDING MULTIPLE CONVERTER UNITS

RELATED APPLICATIONS

The present application claims priority of Japanese Application Number 2018-180851, filed Sep. 26, 2018, the disclosure of which is hereby incorporated by reference herein in its entirety.

BACKGROUND OF THE INVENTION

1. Field of the Invention

The present invention relates to a servo amplifier selection device and particularly relates to a servo amplifier selection device in a system including a plurality of converter units.

2. Description of the Related Art

To date, as described in Japanese Unexamined Patent Application No. 2015-192475, for example, a method for selecting a power source of a motor driving apparatus that can select a power source capacity suitable for an operation is known. The known method for selecting a power source of a motor driving apparatus includes an operation power source capacity acquisition section that, in each of operation patterns, acquires information relating to a torque required for each motor used in the operation pattern and, in accordance with the acquired information about the torque, acquires an operation power source capacity required for the operation in each of the operation patterns, from the power source capacity of each of the motors to be used. The method also includes a power source capacity determination section that determines the power source capacity of a common power source to be able to cover a maximum value of the required operation power source capacity in each of the operation patterns.

SUMMARY OF THE INVENTION

However, when there is a wide range of servo/spindle amplifier line-ups that can drive a plurality of motors, there has been a problem in that a large number of man-hours are needed to select an appropriate servo/spindle amplifier for a desired system. In addition, in terms of motor capacity, when a plurality of converter units (common power sources) serving as a DC power source of the servo/spindle amplifier are necessary, there has been a problem in that the selection of the converter units and a combination of the converter units and the servo/spindle amplifier must also be considered; and in that a more complex selection must be performed.

A servo amplifier selection device accord ng to an example of the present disclosure includes: an amplifier group allocation section configured to allocate each of a plurality of motors to any one of a plurality of amplifier groups on the basis of an amplifier group number input from an input unit; a total rated output calculation section configured to calculate, for each of the plurality of amplifier groups, a total value of rated outputs of the motors allocated to the amplifier group; a common power source selection section configured to determine, for each of a plurality of common power sources (converter units) each having a predetermined power source capacity, whether a magnitude of the power source capacity satisfies a condition of being equal to or greater than the total value of each of the plurality of amplifier groups and configured to select one or a plurality of common power sources satisfying the condition; and a display control section configured to get the selected one or the plurality of common power sources to be identifiably displayed in a display unit for each of the plurality of amplifier groups.

BRIEF DESCRIPTION OF THE DRAWINGS

The invention will be more clearly understood with reference to the following accompanying drawings.

DETAILED DESCRIPTION

Hereinafter, a servo amplifier selection device according to examples of the present disclosure is described with reference to the drawings. However, the technical scope of the invention is not limited to these embodiments and includes the invention described in the claims and elements equivalent thereto.

Figure 1:
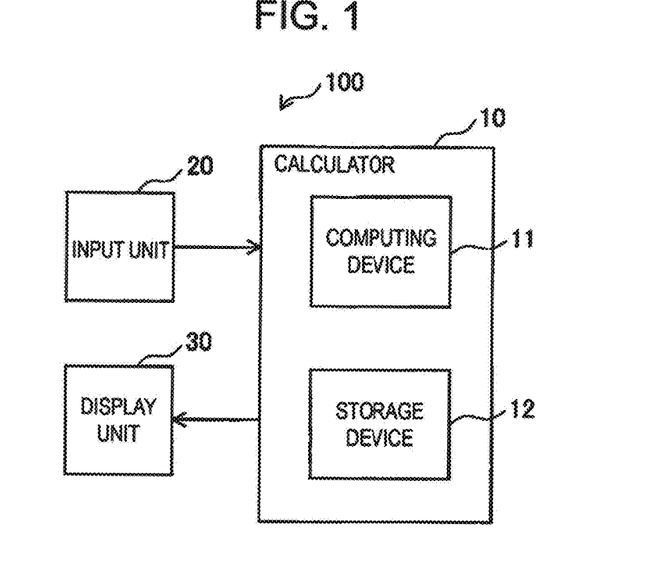
FIG. 1 is a configuration diagram of a system configured to operate a servo amplifier selection device according to Example 1.

First, a servo amplifier selection device according to Example 1 will be described. A configuration diagram of a system for operating the servo amplifier selection device according to Example 1 is illustrated in FIG. 1. A system 100 is provided with a calculator (computer) 10, an input unit.

20, and a display unit 30. The calculator 10 includes a computing device 11 and a storage device 12. The storage device 12 is, for example, a hard disk drive (HDD), a flash memory, or the like and stores a program for realizing the servo amplifier selection device according to Example 1. The computing device 11 executes the program, which is stored in the storage device 12, for realizing the servo amplifier selection device according to Example 1. The program for realizing the servo amplifier selection device may be recorded in a computer readable recording medium.

As the input unit 20, for example, a keyboard, a mouse, or the like can be used. Alternatively, the input section. 20 may be configured by a touch panel provided to be overlaid on a display screen of the display unit 30. By using the input unit 20, a number of common power sources (converter units) to be used, and an amplifier group number, as will be described later, can be input.

A liquid crystal display device or an organic electroluminescent (EL) display device can be used as the display unit 30. In the display unit 30, an input screen of information by the input unit 20 and a list of common power sources selected by a servo amplifier selection device 101 for each of the amplifier groups are displayed.

Figure 2:
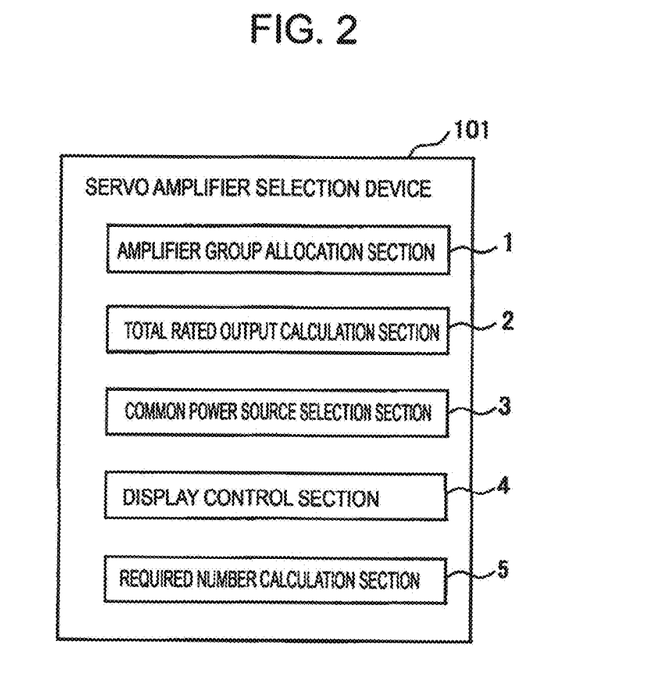
FIG. 2 is a functional block diagram of the servo amplifier selection device according to Example 1.

A functional block diagram of the servo amplifier selection device according to Example 1 is illustrated in FIG. 2. The servo amplifier selection device 101 according to Example 1 can select the common power source configured to supply power to a plurality of motors having a predetermined rated output. The servo amplifier selection device 101 according to Example 1 includes an amplifier group allocation section 1, a total rated output calculation section 2, a common power source selection section 3, and a display control section 4. Here, the amplifier group allocation section 1, the total rated output calculation section 2, the common power source selection section 3, and the display control section 4 are realized by the computing device 11 illustrated in FIG. 1.

Figure 3:
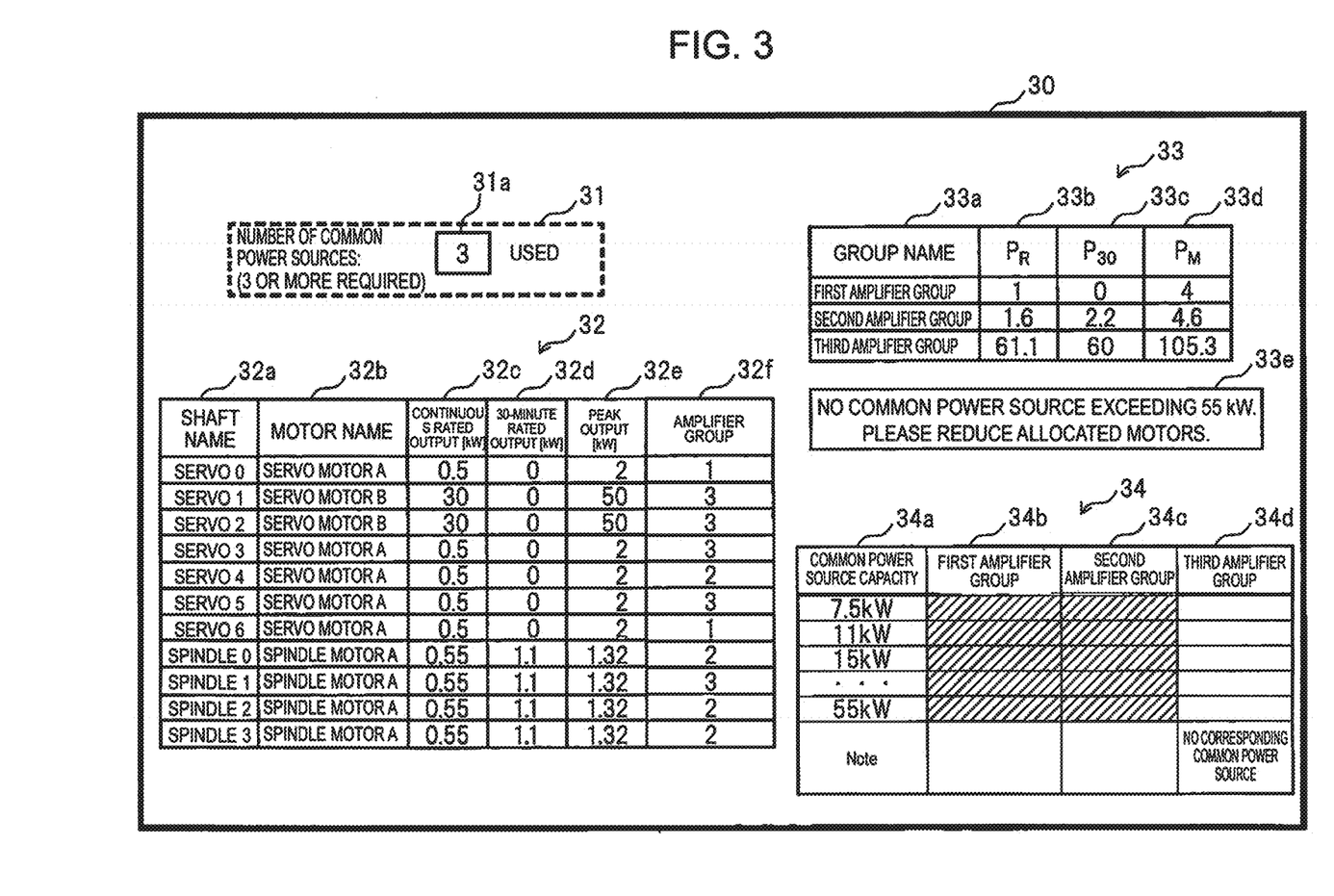
FIG. 3 is a display example of a display unit when common power sources are selected by the servo amplifier selection device according to Example 1.

A display example of the display unit when the common power sources are selected by the servo amplifier selection device according to Example 1 is illustrated in FIG. 3.

As illustrated in FIG. 3, a number of common power sources to be used input section 31, a motor display section 32, a rated output total value display section 33, and a common power source display section 34 are displayed on the display unit 30.

A numerical input section 31a is displayed in the number of common power sources to be used input section 31, and the number of common power sources to be used can be input using the input unit 20. The number input into the numerical input section 31a is the number of the amplifier groups. Here, the amplifier group is a group for bundling a plurality of motors for each common power source supplying power. Here, the motor includes at least one of a servo motor or a spindle motor.

Further, the number of common power sources required can be displayed in the number of common power sources to be used input section 31. The servo amplifier selection device 101 may be provided with a required number calculation section 5 that calculates the minimum required number of common power sources on the basis of a total rated output obtained by adding up the rated outputs of the plurality of motors and of the maximum power source capacity of the common power sources. The display control section 4 can get the number of common power sources to be used input section 31 of the display unit 30 to display the calculated minimum required number of common power sources.

The motor display section 32 includes a shaft name input section 32a, a motor name input section 32b, a continuous rated output display section 32c, a 30-minute rated output display section 32d, a peak output display section 32e, and an amplifier group input section 32f. Either name of the servo shaft and the spindle shaft can be input into the shaft name input section 32a. An example illustrated in FIG. 3 illustrates an example in which servo shafts are input from a zeroth servo shaft ("servo 0") to a sixth servo shaft ("servo 6") and in which spindle shafts are input from a zeroth spindle shaft ("spindle 0") to a third spindle shaft ("spindle 3").

Figure 4:
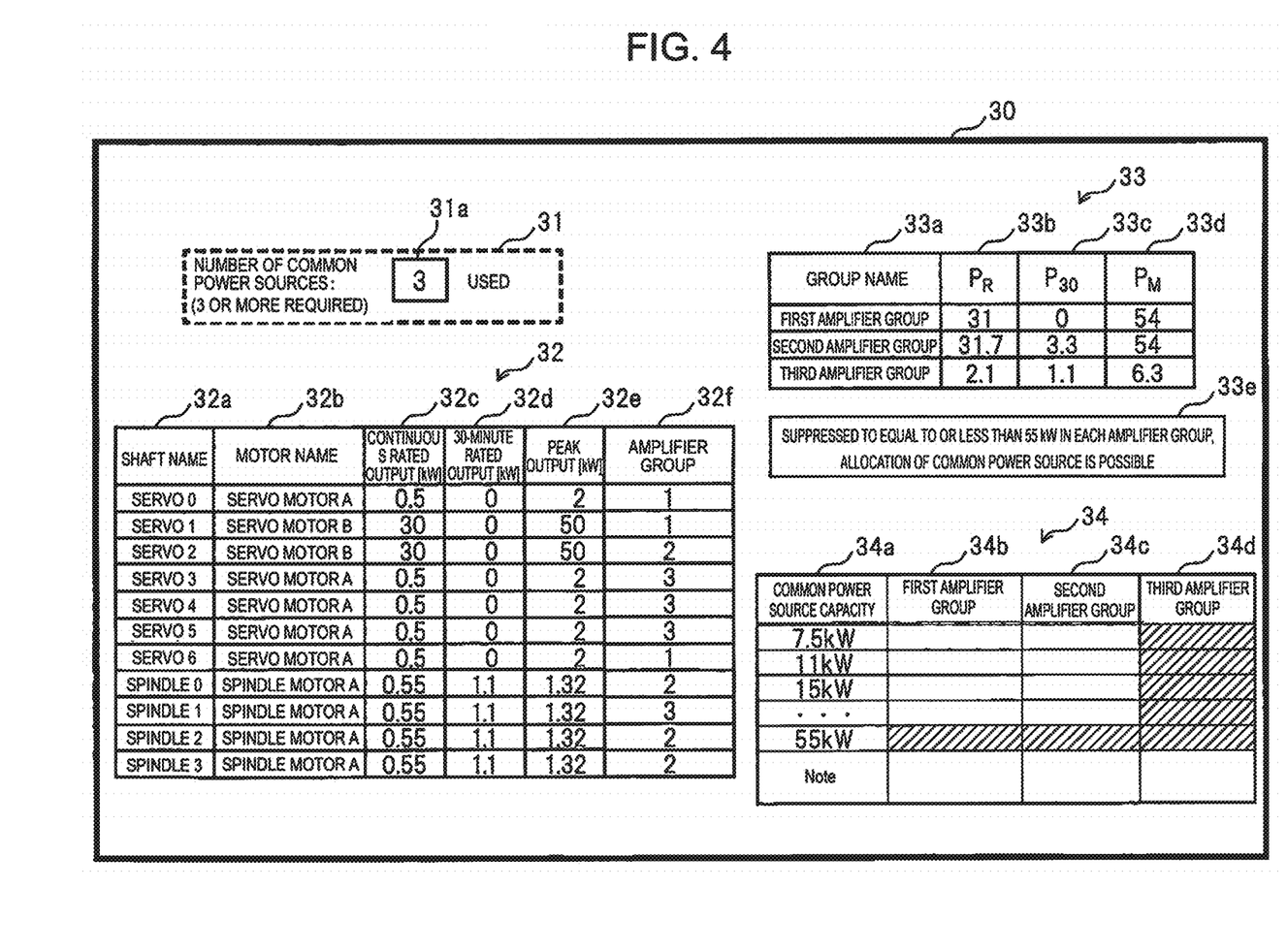
FIG. 4 is another display example of the display unit when the common power sources are selected by the servo amplifier selection device according to Example 1.

A unique name for the servo motor and the spindle motor can be input into the motor name input, section 32b. For example, as illustrated in FIG. 4, a "servo motor A" can be input with respect to the zeroth servo shaft and the third to sixth servo shafts, and a "servo motor B" can be input with respect to the first and second servo shafts. Similarly, a "spindle motor A" can be input with respect to the zeroth spindle shaft to the third spindle shaft.

A database of motors is stored in the storage device 12. The database stores the name of the servo motor and the spindle motor; and the rated output of each of the motors, such as each of values of a continuous rated output, a 30-minute rated output, and a peak output, for example. The rated output preferably includes at least one type of output value, among the continuous rated output, the 30-minute rated output, and the peak output. When the servo motor or the spindle motor name is input into the motor name input section 32b, the display control section 4 reads out, from the database, the continuous rated output, the 30-minute rated output, and the peak output corresponding to the input servo motor or spindle motor, and the read out values are respectively displayed in the continuous rated output display section 32c, the 30-minute rated output display section 32d, and the peak output display section 32e. However, the present invention is not limited to such an example, and a configuration may be adopted in which each of the values relating to the continuous rated output, the 30-minute rated output, and the peak output of the motor can be directly input to the motor display section 32.

A desired amplifier group number is input into the amplifier group input section 32f by a user, in accordance with the number input into the number of common power sources to be used input section 31. For example, when "3" is input into the number of common power sources to be used input section 31, numbers from 1 to 3 are input into the amplifier group input section 32f as the amplifier group numbers.

The amplifier group allocation section 1 allocates each of the plurality of motors to one of the plurality of amplifier groups, on the basis of the amplifier group numbers input into the amplifier group input section 32f. For example, in the example illustrated in FIG. 3, the servo motor of the zeroth servo shaft and the sixth servo shaft is allocated to a first amplifier group, the servo motor of the fourth servo shaft and the spindle motor of the zeroth spindle shaft, the second spindle shaft and the third spindle shaft is allocated to a second amplifier group, and the remaining servo motors and spindle motor are allocated to a third amplifier group.

An amplifier group display section 33a, a continuous rated output ($P_R$) total value display section 33b, a 30-minute rated output ($P_{30}$) total value display section 33c, and a peak output ($P_M$) total value display section 33d are displayed in the rated output total value display section 33. The total rated output calculation section 2 calculates, for each of the plurality of amplifier groups, a total value of the rated outputs of the motors allocated to the amplifier group. For example, a total value of the continuous rated output ($P_R$) of the motors belonging to the first amplifier group is 1 kW, obtained by adding up 0.5 kW of the servo motor A of the zeroth servo shaft, and 0.5 kW of the servo motor A of the sixth servo shaft, and is displayed in the field corresponding to the first amplifier group in the continuous rated output ($P_R$) total value display section 33b. Additionally, a total value of the 30-minute rated output ($P_{30}$) of the motors belonging to the second amplifier group is 3.3 kW, obtained by adding up 0 kW of the servo motor A of the fourth servo shaft and 1.1 kW of the spindle motor A of the zeroth spindle shaft, the second spindle shaft and the third spindle shaft, and is displayed in the field corresponding to the second amplifier group in the 30-minute rated output ($P_{30}$) total value display section 33c. When the total values are calculated in the same manner, the total value of the continuous rated output ($P_R$) of the motors belonging to the third amplifier group is 61.55 kW, and the total value of the peak output ($P_M$) is 105.32 kW. Here, when the maximum value of the capacity of the common power source is 55 kW, there is no common power source capable of driving the motors belonging to the third amplifier group. Thus, when the total value exceeds the maximum power source capacity of the common power source in this way, the display control section 4 preferably gets a warning screen 33e to be displayed in the display unit 30. By displaying a warning screen in this way, the user can quickly recognize that it is necessary to re allocate the amplifier groups. Furthermore, display may be performed to be more noticeable by changing the character color and the font of the value of the rated output of the motors belonging to the amplifier groups for which the total value exceeds the maximum power source capacity of the common power source.

A common power source capacity display section 34a, a common power source selection result display section (hereinafter also referred to as a "first common power source selection result display section") 34b for the first amplifier group, a common power source selection result display section (hereinafter also referred to as a "second common power source selection result display section") 34c for the second amplifier group, and a common power source selection result display section (hereinafter, also referred to as a "third common power source selection result display section") 34d for the third amplifier group are displayed in the common power source display section 34. The common power source selection section 3 determines, for each of the plurality of common power sources having a predetermined power source capacity, whether or not the magnitude of the power source capacity satisfies a condition of being equal to or greater than the total value of the rated outputs of each of the motors belonging to the plurality of amplifier groups and selects the common power source that satisfies the condition.

When the plurality of types of output values are included in the rated output, the total value is a maximum value among the total values of each of the plurality of types of output value for each of the amplifier groups. For example, since, for the first amplifier group, $P_R$ is 1 kw, $P_{30}$ is 0 kW and $P_M$ is 4 kW, when determining whether the common power source can be used or not, the rated output used as reference is $P_M$ of 4 kW.

It is assumed that a plurality of types of common power source having various power source capacities are available, such as a plurality of common power sources having power source capacities of 7.5, 11, 15, ... 55 kW. First, the common power source selection section 3 determines, with respect to the common power source having the power source capacity of 7.5 kW, whether or not the power can be supplied to the plurality of motors belonging to the first amplifier group. The common power source selection section 3 selects the common power source having the power source capacity of 7.5 kW as the common power source that satisfies the condition described above because the magnitude of the power source capacity of 7.5 kW is equal to or greater than 4 kW that is the total value of the rated outputs of the first amplifier group. Similarly, the common power sources having power source capacities of 11, 15, ... 55 kW are also selected as the common power source capable of driving the motors belonging to the first amplifier group.

The display control section 4 displays the selected common power sources by each of the plurality of amplifier groups on the display unit 30, such that the selected common power sources can be identified. For example, since the motors belonging to the first amplifier group are selected as being able to use the common power sources of all the power source capacities of 7.5 to 55 kW, field areas corresponding to ail the power source capacities of 7.5 to 55 kW in the first common power source selection result display section 34b are marked with hatching or the like, to be displayed in an identifiable manner. Similarly, since the motors belonging to the second amplifier group are selected as being able to use the common power sources of all of the power source capacities of 7.5 to 55 kW, the field area corresponding to all the power source capacities of 7.5 to 55 kW in the second common power source selection result display unit 34c are marked with hatching or the like, to be displayed in an identifiable manner. By performing the display in this manner, the common power source that can be used for the motors belonging to each of the amplifier groups can be easily identified.

On the other hand, for the third amplifier group, the maximum value of the total values of the rated outputs is the total value of the peak output ($P_M$) that is 105.3 kW, and this value is a reference value for determining whether or not the common power source can be used. Since the maximum value of the power source capacities of the common power sources is 55 kW, the common power source capable of driving the motors belonging to the third amplifier group is not present among the power source capacities of 7.5 to 55 kW. Therefore, in the third common power source selection result display section 34d, none of the fields corresponding to the common power sources are displayed using hatching or the like. In this case, "no corresponding common power source" may be displayed in a remarks field of the third common power source selection result display section 34d.

As described above, in the example illustrated in FIG. 3, since there is no common power source that can be used for the third amplifier group, the user can easily recognize that the allocation of the amplifier groups needs to be reconfigured. Here, an example of reconfiguring the amplifier groups will be described. Another display example of the display unit when the common power sources are selected by the servo amplifier selection device according to Example 1 is illustrated in FIG. 4. In the example illustrated in FIG. 4, the servo motor B of the first servo shaft ("servo 1") is changed from the third amplifier group to the first amplifier group, and the servo motor B of the second servo shaft ("servo 2") is changed from the third amplifier group to the second amplifier group. In addition, the servo motor A of the fourth servo shaft ("servo 4") is changed from the second amplifier group to the third amplifier group. When the amplifier groups are reconfigured in this manner, the total value of the rated output of each of the amplifier groups is recalculated, and the calculation results are displayed in the rated output total value display section 33. From these calculation results, it can be seen that the maximum rated output is the total value of the peak output ($P_M$), and is calculated as 54 kW for the first and second amplifier groups and 7.32 kW for the third amplifier group. As a result, the motors belonging to the first and second amplifier groups are only able to use the common power source having the power source capacity of 55 kW, and in the common power source display section 34, the hatching or the like is applied only to the field area corresponding to the common power source having the power source capacity of 55 kW. On the other hand, the motors belonging to the third amplifier group are selected as being able to use the common power sources having all the power source capacities of 7.5 to 55 KW, and thus the field area corresponding to all the power source capacities of 7.5 to 55 kW in the third common power source selection result display section 34*d* are marked with hatching or the like to be displayed in an identifiable manner. In this way, in the example illustrated in FIG. 4, the user can easily recognize that the common power sources can be allocated for ail of the first to third amplifier groups.

Figure 5:
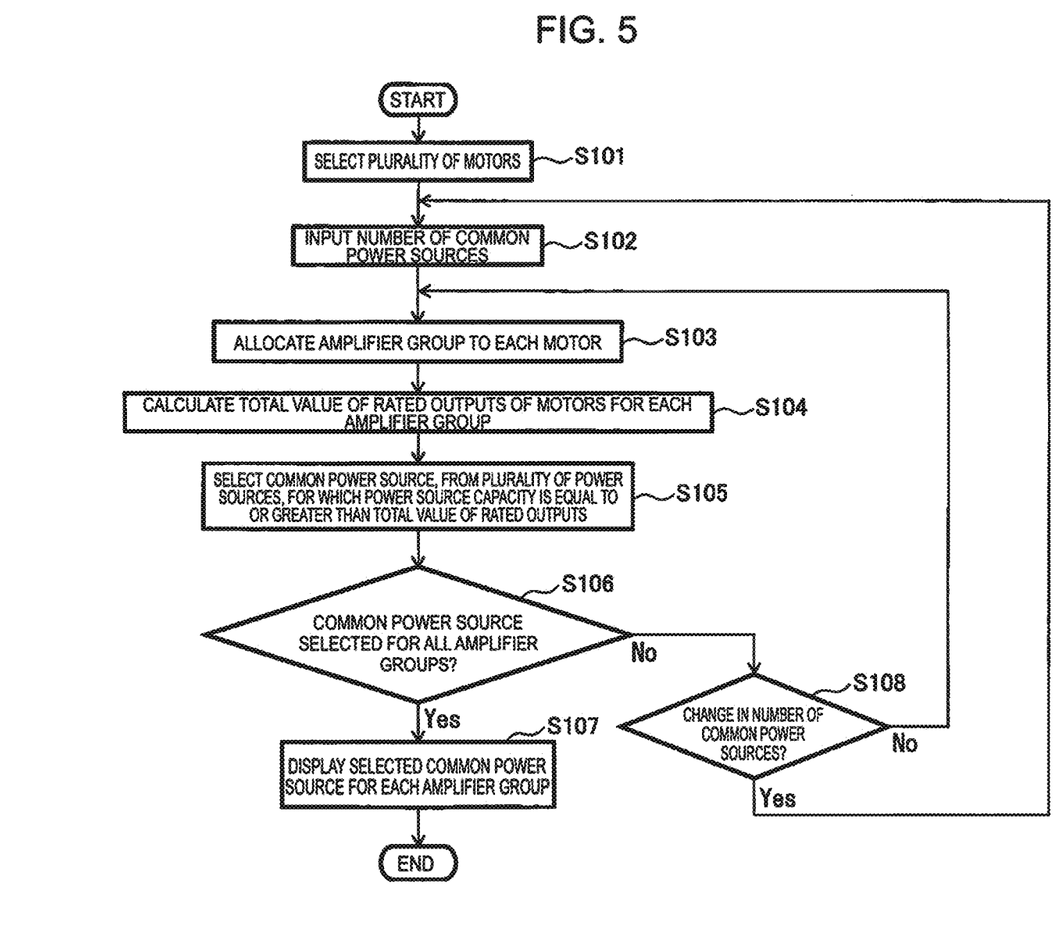
FIG. 5 is a flowchart illustrating a procedure to select the common power sources by the servo amplifier selection device according to Example 1.

Next, a procedure for selecting the common power source using the servo amplifier selection device according to Example 1 will be described using a flowchart illustrated in FIG. 5. First, at step S101, the plurality of motors are selected. For example, as illustrated in the motor display section 32 in FIG. 3, the servo motors and the spindle motor may be chosen.

Next, at step S102, the number of common power sources is input. For example, as illustrated in FIG. 3, the number of common power sources to be used can be input into the number of common power sources to be used input section 31 31.

Next, at step S103, the amplifier group is allocated to each of the motors. For example, as illustrated in FIG. 3, the user inputs the desired amplifier group numbers into the amplifier group input section 32*f* in accordance with the number input in the number of common power sources to be used input section 31 31.

Next, at step S104, a total value of the rated outputs of the motors is calculated for each of the amplifier groups. Specifically, the total rated output calculation section 2 calculates, for each of the plurality of amplifier groups, a total value of the rated outputs of the motors allocated to the corresponding amplifier group. For example, for each of the plurality of amplifier group, a total value of each of the continuous rated output, the 30-minute rated output, and the peak output is calculated. As illustrated in FIG. 3, for each of the plurality of amplifier groups, the total value of the continuous rated output, the total value of the 30-minute rated output, and the total value of the peak output are displayed in the rated output total value display section 33.

Next, at step S105, the common power source having a power source capacity being equal to or greater than the total value of the rated output is selected from among the plurality of common power sources. Specifically, the common power source selection section 3 determines, for each of the plurality of common power sources having the predetermined power source capacity, whether or not the magnitude of the power source capacity satisfies the condition of being equal to or greater than the total value of each of the plurality of amplifier groups and selects the common power source that satisfies the condition.

Next, at step S106, it is determined whether or not the common power source has been selected for all of the amplifier groups. As illustrated in FIG. 3, if one or more common power sources that can be used are included in all of the first common power source selection result display section 34*b*, the second common power source selection result display section 34*c*, and the third common power source selection result display section 34*d* in the common power source display section 34, it can be determined that the common power source selected for all of the amplifier groups. In this case, at step S107, the display control section 4 displays the selected common power source in the common power source display section 34 of the display unit 30 for each of the plurality of amplifier groups such that the selected common power source can be identified.

On the other hand, when a common power source that can be used is not included in any one of the first common power source selection result display section 34*b*, the second common power source selection result display section 34*c*, or the third common power source selection result display section 34*d* of the common power source display section 34, it is necessary to re allocate the amplifier groups. Then, at step S108, it is determined whether or not the number of common power sources is to be changed.

When it is determined that the number of common power sources is to be changed, the procedure returns to step S102 and the number of common power sources is input once more. For example, as illustrated in FIG. 3, the number of common power sources to be used input in the numerical input section 31*a* of the number of common power sources to be used input section 31 is changed from 3 to 4 and input. Thereafter, at step S103, the amplifier group is again allocated to each of the motors.

On the other hand, when it is determined at step S108 that the number of common power sources is not to be changed, the number of common power sources is maintained, and at step S103, the amplifier group is again allocated to each of the motors.

Hereinafter, similarly, steps S104 to S108 are repeated until the common power sources are allocated for all of the amplifier groups.

As described above, according to the servo amplifier selection device according to Example 1, a means is introduced for allocating the amplifier group to each of the plurality of motors to be used, and by displaying candidates for the common power source that can be used from among the plurality of common power sources, it is possible to visually organize a selection status while selecting the common power source. Thus, the complexity of selecting the common power source can be resolved.

Figure 6:
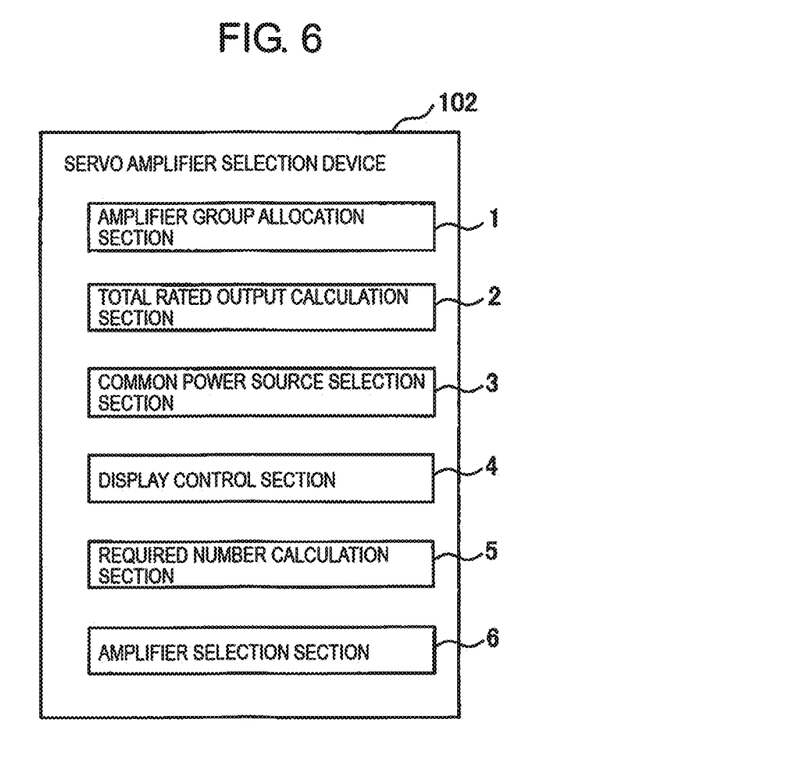
FIG. 6 is a functional block diagram of a servo amplifier selection device according to Example 2.

Next, a servo amplifier selection device according to Example 2 will be described. A functional block diagram of the amplifier selection device according to Example 2 is illustrated in FIG. 6. A servo amplifier selection device 102 according to Example 2 differs from the servo amplifier selection device 101 according to Example 1 in that the servo amplifier selection device 102 further includes an amplifier selection section that selects one or a plurality of the first amplifiers, from among a plurality of first amplifiers each having a predetermined capacity, each being housed in a housing having a predetermined width, and each including a function to drive one motor, for each of the one or more motors allocated to one amplifier group among the plurality of amplifier groups. The amplifier selection section has a capacity that is equal to or greater than the rated output of the corresponding motor and selects one or a plurality of the first amplifiers such that a total value of the widths of the housings of the plurality of first amplifiers is minimized. Other than this, the configuration of the servo amplifier selection device 102 according to Example 2 is similar to the configuration of the servo amplifier selection device 101 according to Example 1, and a detailed description is thus omitted here.

In Example 1, the servo amplifier selection device that selects the common power source configured to supply power to the plurality of motors is described. However, the servo amplifier selection device according to Example 2 further includes an amplifier selection section that selects an amplifier configured to drive the motor. Here, it is assumed that, as an amplifier that drives a motor, there is a first amplifier in which one servo amplifier drives only one servo motor, a second amplifier in which one servo amplifier drives a plurality of servo motors, and a third amplifier in which a common power source is integrated.

Figure 7A:
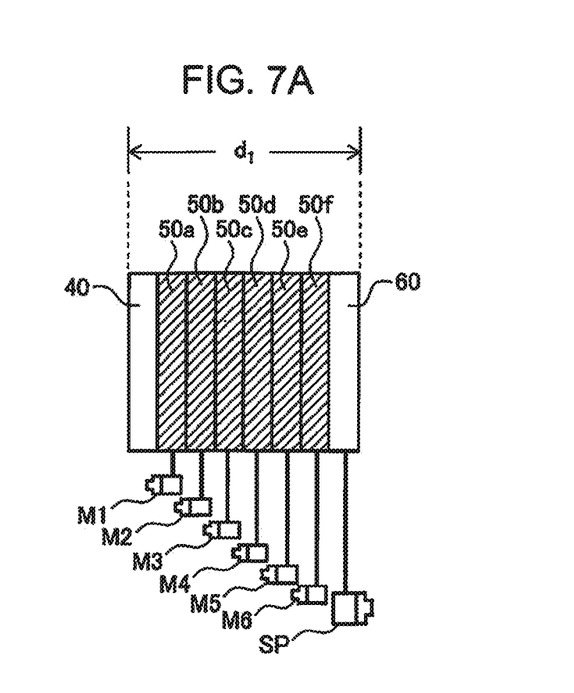
FIG. 7A is a diagram illustrating an arrangement example of a common power source selected by the servo amplifier selection device according to Example 2 and amplifiers that individually drive a plurality of motors.

First, a case in which the one servo amplifier drive s only the one servo motor will be described. In FIG. 7A, an arrangement example of a common power source selected by the servo amplifier selection device according to Example 2 and of amplifiers that individually drive a plurality of motors is illustrated. For example, it is assumed that the servo amplifier selection device 102 selects a common power source 40 in order to drive servo motors M1 to M6 and a spindle motor SP allocated to one of the plurality of amplifier groups. For each of the servo motors M1 to M6 and the spindle motor SP, an amplifier selection section 6 selects one or a plurality of the first amplifiers, from among the plurality of first amplifiers that each has a predetermined capacity, each is housed in a housing having a predetermined width, and each has a function to drive one servo motor. For example, the amplifier selection section 6 selects first amplifiers 50*a* to 50*f* configured to drive the servo motors M1 to M6; and a spindle amplifier 60 configured to drive the spindle motor SP. Focusing on the first amplifiers 50*a* to 50*f*, the amplifier selection section 6 preferably selects the one or the plurality of first amplifiers, each having a capacity that is equal to or greater than the rated output of each of the servo motors M1 to M6, for which a total value of the widths of the housings of the plurality of first amplifiers 50*a* to 50*f* is minimized.

The first amplifiers 50*a* to 50*f* configured to drive the servo motors M1 to M6 and the spindle amplifier 60 configured to drive the spindle motor SP are arranged side-by-side in this common power source 40. Here, the first amplifiers 50*a* to 50*f* individually drive each of the servo motors M1 to M6. At this time, the first amplifiers 50*a* to 50*f* and the spindle amplifier 60 are selected such that a total value $d_1$ of the widths of the common power source 40, the first amplifiers 50*a* to 50*f*, and the first spindle amplifier 60 is minimized.

Figure 7B:
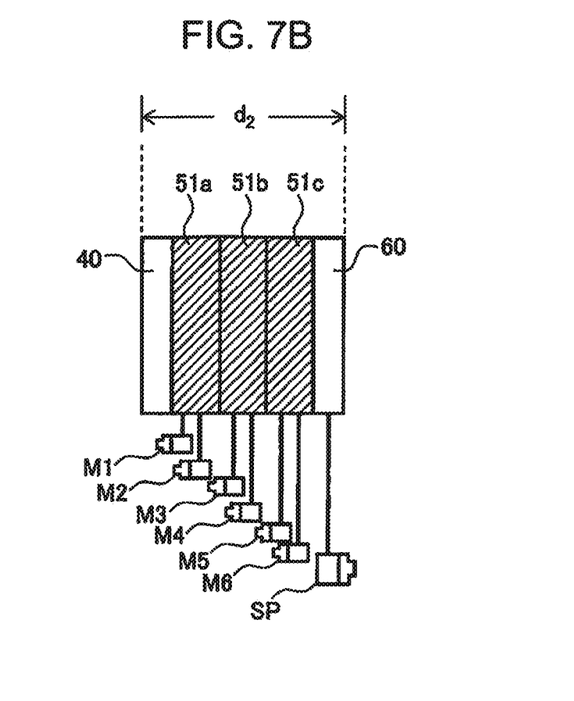
FIG. 7B is a diagram illustrating an arrangement example including the common power source selected by the servo amplifier selection device according to Example 2 and amplifiers that drive two motors using one amplifier.

Next, a configuration is considered in which the widths of the housings are minimized by using the second amplifier capable of driving two servo motors with a single servo amplifier. In FIG. 7B, an arrangement example of the common power source selected by the servo amplifier selection device according to Example 2 and the second amplifiers that drive two servo motors using one amplifier is illustrated. This configuration further includes the second amplifier that has a capacity equal to or greater than the total value of the capacities of the plurality of first amplifiers, that is housed in a housing having a predetermined width, and that has a function to drive a plurality of servo motors. For example, the two first amplifiers 50*a* and 50*b* are replaced by one second amplifier 51*a*, the two first amplifiers 50*c* and 50*d* are replaced by one second amplifier 51*b*, and the two first amplifiers 50*e* and 50*f* are replaced by one second amplifier 51*c*. Furthermore, when the total value of the widths of the housings of the first amplifiers 50*a* and 50*b* that drive the servo motors M1 and M2, respectively, is greater than the width of the housing of the one second amplifier 51*a* that drives the servo motors M1 and M2, the amplifier selection section 6 replaces the first amplifiers 50*a* and 50*b* with the second amplifier 51*a*. Similarly, the first amplifiers 50*c* and 50*d* are replaced by the second amplifier 51*b*, and the first amplifiers 50*e* and 50*f* are replaced by the second amplifier 51*c*. As a result, a width $d_2$ obtained when the common power source 40, the second amplifiers 51*a* to 51*c*, and the spindle amplifier 60 are arranged side-by-side can be made smaller than $d_1$.

Figure 7C:
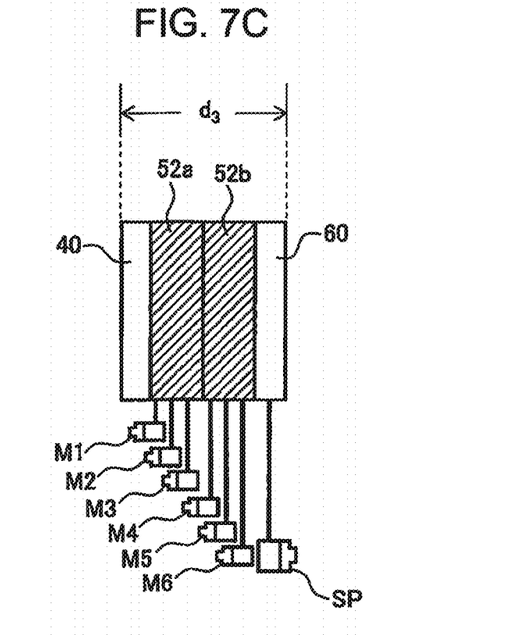
FIG. 7C is a diagram illustrating an arrangement example including the common power source selected by the servo amplifier selection device according to Example 2 and amplifiers that drive three motors using one amplifier.

Next, a configuration is considered in which the widths of the housings are minimized by using the second amplifier capable of driving three servo motors. In FIG. 7C, an arrangement example of the common power source selected by the servo amplifier selection device according to Example 2 and the second amplifiers that drive three servo motors using one amplifier is illustrated. Three of the first amplifiers can be replaced by the one second amplifier that has a capacity equal to or greater than the total value of the capacities of the three first amplifiers, that is housed in a housing having a predetermined width, and that has a function to drive three servo motors. For example, the three first amplifiers 50*a*, 50*b*, and 50*c* are replaced by one second amplifier 52*a*, and the three first amplifiers 50*d*, 50*e*, and 50*f* are replaced by one second amplifier 52*b*. Furthermore, when the total value of the widths of the housings of the three first amplifiers 50*a*, 50*b*, and 50*c* that drive the three servo motors M1 to M3, respectively, is greater than the width of the housing of the single second amplifier 52*a* that drives the three servo motors M1 to 143, the amplifier selection section 6 replaces the three first amplifiers 50*a*, 50*b*, and 50*c* with the second amplifier 52*a*. Similarly, the three first amplifiers 50*d*, 50*e*, and 50*f* are replaced with the second amplifier 52*b*. As a result, a width $d_3$ obtained when the common power source 40, the second amplifiers 52*a* and 52*b*, and the spindle amplifier 60 are arranged side-by-can be made smaller than $d_1$.

Figure 7D:
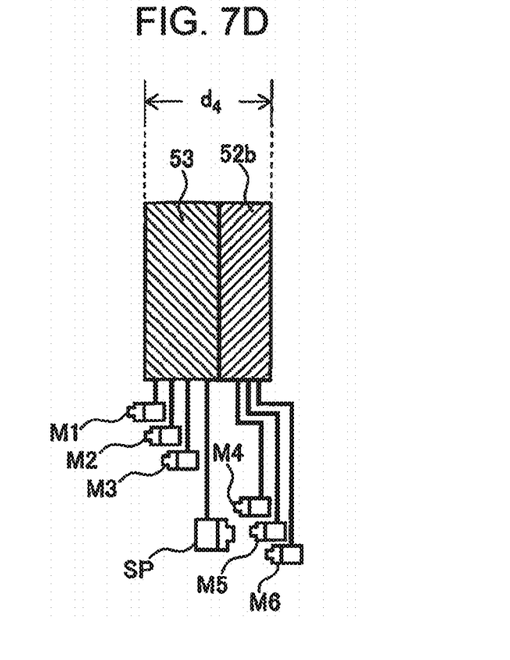
FIG. 7D is a diagram illustrating an arrangement example including an amplifier that is integrated with the common power source by the servo amplifier selection device according to Example 2.

Next, a configuration is considered in which the width of the housings is minimized by using the third amplifier capable of being integrated with the common power source. In FIG. 7D, an arrangement example is illustrated that includes the third amplifier that is integrated with the common power source by the servo amplifier selection device according to Example 2. It is assumed that the common power source 40, the first amplifiers 50*a* to 50*c*, and the spindle amplifier 60 can be integrated and replaced with a third amplifier 53 housed in a housing having a predetermined width.

When the total value of the widths of the housings of the common power source 40, the first amplifiers 50*a* to 50*c*, and the spindle amplifier 60 is greater than the width of the housing of the third amplifier 53, the amplifier selection section 6 replaces the common power source 40, the first amplifiers 50*a* to 50*c*, and the spindle amplifier 60 with the third amplifier 53. As a result, a width $d_4$ obtained when the third amplifier 53 and the second amplifier 52*b* are arranged side by side can be made smaller than $d_3$.

Figure 8A:
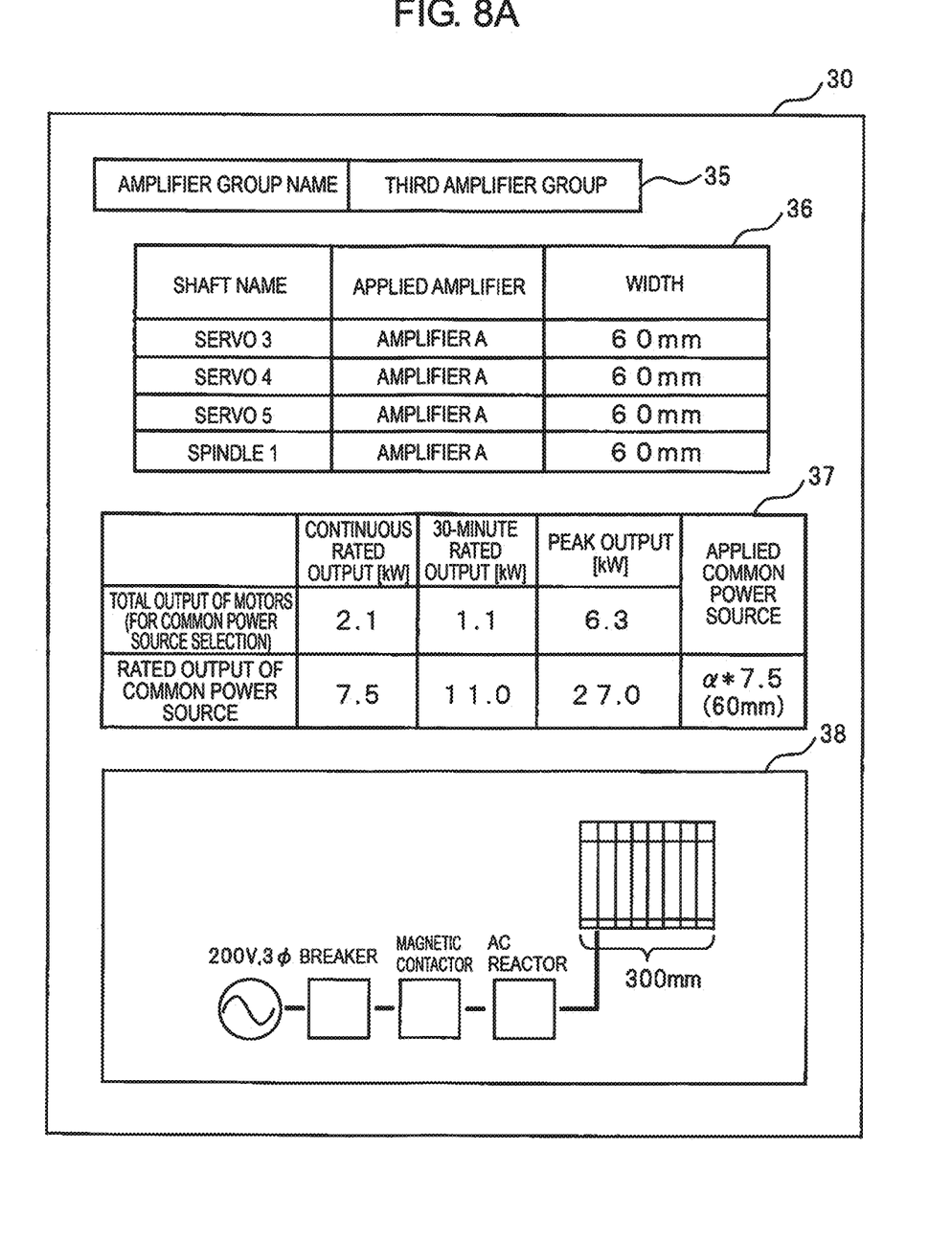
FIG. 8A is a display example of a selection screen for the common power source selected by the servo amplifier selection device according to Example 1 and for amplifiers that individually drive a plurality of motors.

Next, an example of performing display on a display unit when selecting the amplifier having the width of the housing minimized as described above will be described. A display example of a selection screen for a common power source selected by the servo amplifier selection device according to Example 1; and for amplifiers that individually drive a plurality of motors is illustrated in FIG. 8A. An amplifier group name display section 35, an applied amplifier display section 36, an applied common power source display section 37, and a layout display section 38 are displayed in the display unit 30. An example is illustrated in which the third amplifier group illustrated in FIG. 4 is selected in the amplifier group name display section 35. However, other amplifier groups may also be specified.

Because the shafts belonging to the third amplifier group, for which "3" is input into the amplifier group input section 32*f* of the motor display section 32 in FIG. 4, are a "servo 3", a "servo 4", a "servo 5", and a "spindle 1" these shaft names are displayed in the applied amplifier display section 36. In addition, it is assumed that all of the amplifiers individually applied to the motors driving these shafts are amplifiers A, and the width of the housing of each is 60 mm.

In the applied common power source display section 37, "α*7.5" representing the name of the type of common power source that has the rated output of 7.5 kW and a housing width of 60 mm is displayed, as a candidate common power source to be applied. The width "300 mm" of the overall housing including the common power source and the four amplifiers is displayed in the layout display section 38, along with an arrangement example of the common power source and the amplifiers.

Figure 8B:
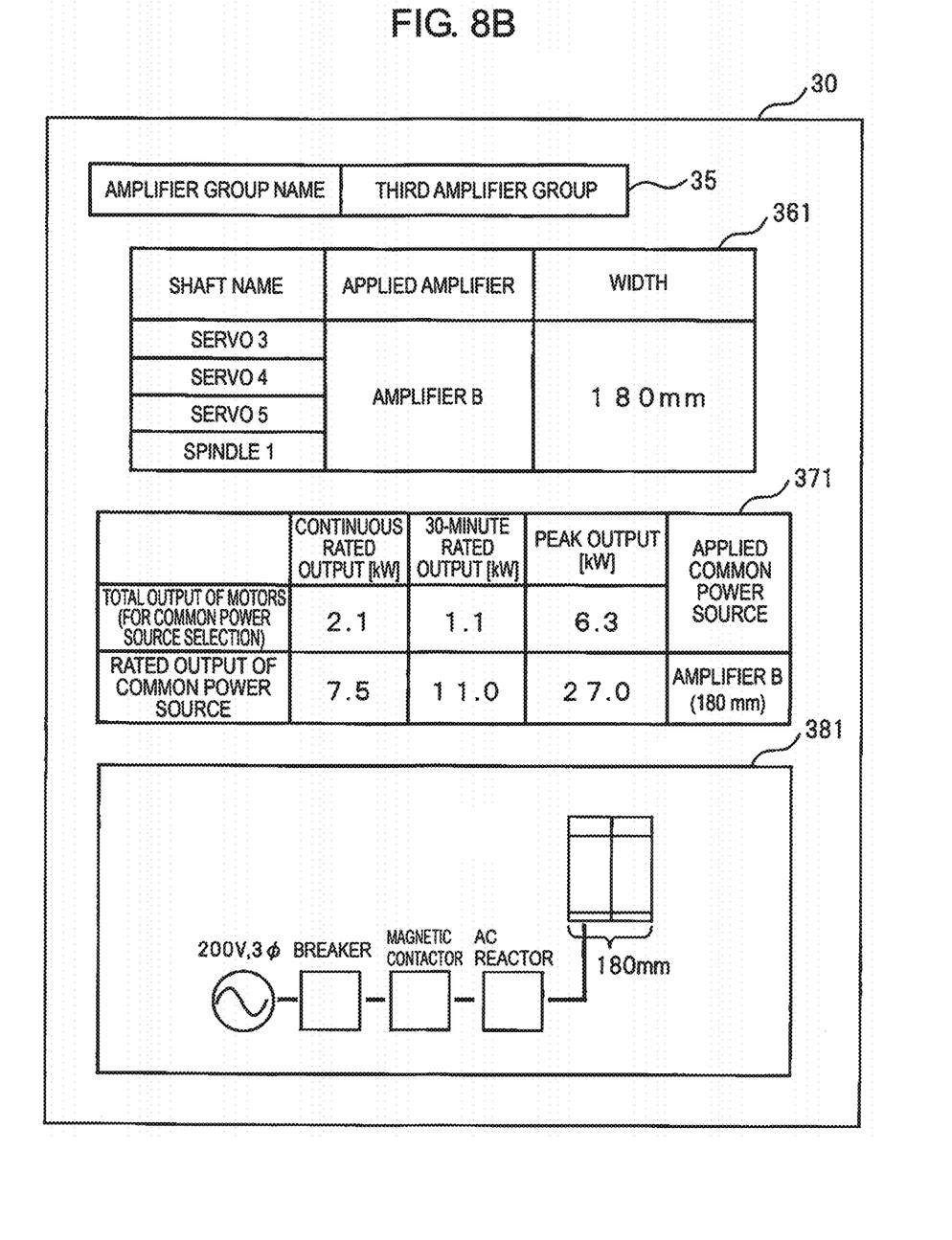
FIG. 8B is a display example of the selection screen for the common power source having an amplifier width being minimized by the servo amplifier selection device according to Example 2 and for an amplifier that drives the plurality of motors.

An example of display on the display unit when, with respect to a candidate common power source provisionally selected in this way, the width of the housing is minimized by the servo amplifier selection device according to Example 2 will be described. A display example of the selection screen for the common power source having an amplifier width being minimized by the servo amplifier selection device according to Example 2; and for an amplifier that drives the plurality of motors is illustrated in FIG. 8B. Here, an example in which the common power source and the four amplifiers illustrated in FIG. 8A are replaced by one amplifier will be described. It is assumed that a single amplifier B is displayed as the applied amplifier in a post-replacement applied amplifier display section 361 and that the width of the housing thereof is 180 mm.

Since the common power source is also integrated with the amplifier B, the amplifier B is also displayed as the applied common power source in a post-replacement applied common power source display section 371. Furthermore, the overall width "180 mm" of the housing is displayed in a post-replacement layout display section 381, along with an arrangement example of the amplifier integrated with the common power source.

As described above, according to the servo amplifier selection device according to Example 2, a system configuration can be realized in which the width of the overall housing including the common power source and the amplifiers is reduced.

As described above, according to the servo amplifier selection device according to the examples of the present disclosure, due to the function of allocating the motors to the amplifier groups that can be defined by the user, the selection of the amplifier can be made in line with a design concept of the user.

The invention claimed is:

1. A servo amplifier selection device comprising:
   an amplifier group allocation section configured to allocate each of a plurality of motors to any one of a plurality of amplifier groups on the basis of an amplifier group number input from an input unit;
   a total rated output calculation section configured to calculate, for each of the plurality of amplifier groups, a total value of rated outputs of the motors allocated to the amplifier group;
   a common power source selection section configured to determine, for each of a plurality of common power sources each having a predetermined power source capacity, whether a magnitude of the power source capacity satisfies a condition of being equal to or greater than the total value of each of the plurality of amplifier groups and configured to select one or a plurality of common power sources satisfying the condition; and
   a display control section configured to get the selected one or the plurality of common power sources to be identifiably displayed in a display unit for each of the plurality of amplifier groups.

2. The servo amplifier selection device of claim 1, further comprising:
   a required number calculation section configured to calculate a minimum required number of common power sources on the basis of a total rated output obtained by adding up the rated outputs of the plurality of motors and of a maximum power source capacity of the common power source, wherein
   the display control section gets the calculated minimum required number of common power sources to be displayed in the display unit.

3. The servo amplifier selection device of claim 1, wherein
   the rated output includes at least one type of output value of a continuous rated output, a 30-minute rated output, or a peak output.

4. The servo amplifier selection device of claim 3, wherein
   when the rated output includes a plurality of types of output value, the total value is a maximum value, among total values of each of the plurality of types of output value for each of the amplifier groups.

5. The servo amplifier selection device of claim 1, wherein
   when the total value exceeds a maximum power source capacity of the common power source, the display control section gets a warning screen to be displayed in the display unit.

6. The servo amplifier selection device of claim 1, wherein
   the motor includes at least one of a servo motor or a spindle motor.

7. The servo amplifier selection device of claim 1, further comprising:
   an amplifier selection section configured to select one or a plurality of first amplifiers, from among a plurality of the first amplifiers, each having a predetermined capacity, each being housed in a housing of a predetermined width, and each having a function to drive one motor, for each of one or a plurality of the motors allocated to a single amplifier group among the plurality of amplifier groups, wherein
   the amplifier selection section selects the one or the plurality of first amplifiers having a capacity equal to or greater than a rated output of the motor and having a total value of widths of the housings of the plurality of first amplifiers being minimized.

8. The servo amplifier selection device of claim 7, further comprising:
   a second amplifier having a capacity equal to or greater than a total value of capacities of the plurality of first amplifiers, being housed in a housing of a predetermined width, and having a function to drive a plurality of motors, wherein when a total value of the widths of the housings of the plurality of first amplifiers configured to respectively drive the plurality of motors is greater than a width of the housing of the one second amplifier configured to drive the plurality of motors, the amplifier selection section replaces the plurality of first amplifiers with the second amplifier.

9. The servo amplifier selection device of claim 8, wherein the first amplifier or the second amplifier is replaceable with a third amplifier, the third amplifier including the common power source being integrated with the first amplifier and the second amplifier, the third amplifier being housed in a housing of a predetermined width, and when a total value of the widths of the housings of the first amplifier or the second amplifier is greater than the width of the housing of the third amplifier, the amplifier selection section replaces the first amplifier or the second amplifier with the third amplifier.

\* \* \* \* \*